(12) United States Patent
Sela et al.

(10) Patent No.: US 10,929,032 B1
(45) Date of Patent: Feb. 23, 2021

(54) HOST HINTING FOR SMART DISK ALLOCATION TO IMPROVE SEQUENTIAL ACCESS PERFORMANCE

(71) Applicant: EMC IP HOLDING COMPANY LLC, Hopkinton, MA (US)

(72) Inventors: Nir Sela, Kochav Yair (IL); Gabriel Benhanokh, Tel-Aviv (IL); Arieh Don, Newton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 15/383,191

(22) Filed: Dec. 19, 2016

(51) Int. Cl.
 *G06F 3/06* (2006.01)
(52) U.S. Cl.
 CPC ............ *G06F 3/0631* (2013.01); *G06F 3/061* (2013.01); *G06F 3/067* (2013.01); *G06F 3/0653* (2013.01)
(58) Field of Classification Search
 None
 See application file for complete search history.

(56) References Cited

U.S. PATENT DOCUMENTS

| 6,260,115 | B1* | 7/2001 | Permut | G06F 12/0862 |
| | | | | 711/133 |
| 9,612,754 | B1* | 4/2017 | Delgado | G06F 3/0611 |
| 2008/0162735 | A1* | 7/2008 | Voigt | G06F 3/0605 |
| | | | | 710/6 |
| 2008/0320155 | A1* | 12/2008 | Ganapathy | G06F 17/30203 |
| | | | | 709/230 |
| 2016/0210045 | A1* | 7/2016 | Hahn | G06F 3/064 |
| 2016/0274797 | A1* | 9/2016 | Hahn | G06F 3/0605 |
| 2017/0308472 | A1* | 10/2017 | Kondo | G06F 12/0862 |

OTHER PUBLICATIONS

Microsoft Press Computer Dictionary, Third Edition. 1997. p. 425.*
Tanenbaum, Andrew S. Structured Computer Organization, Third Edition. 1990. pp. 48-51.*

* cited by examiner

*Primary Examiner* — Kevin Verbrugge
(74) *Attorney, Agent, or Firm* — Anderson Gorecki LLP (57) ABSTRACT

In a computer network in which a data storage array maintains data for at least one host computer, the host computer provides sequential access hints to the storage array. A monitoring program monitors a host application running on the host computer to detect generation of data that is likely to be sequentially accessed by the host application along with associated data. When the host application writes such data to a thinly provisioned logical production volume the monitoring program prompts a multipath IO driver to generate the sequential access hint. In response to the hint the storage array allocates a plurality of sequential storage spaces on a hard disk drive for the data and the associated data. The allocated storage locations on the hard disk drive are written in a spatial sequence that matches the spatial sequence in which the storage locations on the production volume are written.

20 Claims, 4 Drawing Sheets

HOST HINTING FOR SMART DISK ALLOCATION TO IMPROVE SEQUENTIAL ACCESS PERFORMANCE

BACKGROUND

The subject matter of this disclosure is generally related to computer networks in which a data storage system is used to maintain data for multiple host servers and concurrent users. The host servers may run host applications such as a database, file server or block server, for example and without limitation. The data storage system may include one or more storage arrays, each of which may include a plurality of interconnected computing nodes. The computing nodes manage access to host application data stored on tangible data storage devices such as disk drives and flash drives. For example, the computing nodes present one or more logical production volumes to the host applications. The logical production volumes are backed by the tangible data storage devices. The host applications access host application data by sending IOs with reference to the logical production volumes.

SUMMARY

All examples, aspects and features mentioned in this document can be combined in any technically possible way.

In accordance with an aspect a method comprises: in a computer network comprising a host computer and a storage array: monitoring a host application running on the host computer to detect generation of data that is likely to be sequentially accessed by the host application with associated data; generating a hint indicating that the data is likely to be sequentially accessed by the host application with the associated data; sending the data and the hint to the storage array; responsive to the hint, allocating sequential storage space on a hard disk drive in the storage array for the data and the associated data; and writing the data to the allocated storage space in the storage array. In some implementations writing the data to the allocated storage space in the storage array comprises writing the data to a minimum allocation unit of storage on the hard disk drive. In some implementations allocating storage space in the storage array for the data and the associated data comprises allocating an optimal allocation unit of storage on the hard disk drive, the optimal allocation unit comprising sequential minimum allocation units of storage. In some implementations the host application writes the data and associated data to a logical production volume in a spatial sequence and the storage array writes the data and associated data to the allocated storage space in the storage array in the spatial sequence. In some implementations the host application writes the data and associated data to the logical production volume in a temporal sequence that differs from the spatial sequence. In some implementations generating the hint comprises a multi-path input-output driver of the host computer including the hint in a command descriptor block. In some implementations the logical production volume is thinly provisioned and allocating sequential storage space on the hard disk drive in the storage array for the data and the associated data comprises marking sequential locations in an allocation table as written. In some implementations a pointer is added to the allocation table, the pointer indicating a location at which the data is written to the allocated storage space on the hard disk drive in the storage array.

In accordance with an aspect an apparatus comprises: a processor; computer-readable non-transitory memory; a host application; and computer program code stored on the computer-readable non-transitory memory, the computer program code comprising instructions that: monitor the host application to detect generation of data that is likely to be sequentially accessed by the host application with associated data; generate a hint indicating that the data is likely to be sequentially accessed by the host application with the associated data; and send the data and the hint to a storage array. In some implementations the computer program code comprises instructions that write the data and associated data to a logical production volume in a spatial sequence corresponding to a sequence in which the data and associated data will be accessed. In some implementations the computer program code comprises instructions that write the data and the associated data to the logical production volume in a temporal sequence that differs from the spatial sequence. In some implementations the computer program code comprises instructions that select a path to the storage array and include the hint in a command descriptor block.

In accordance with an aspect an apparatus comprises: a storage array comprising: a plurality of computing nodes, each computing node comprising a processor and a cache; a plurality of hard disk drives that are managed by the computing nodes; and computer program code instructions on non-transitory memory that: presents a production volume to a host application, the production volume being backed by the hard disk drives; responsive to a hint indicating that data that is being written to the storage array is likely to be sequentially accessed by a host application with associated data, allocates sequential storage space on one of the hard disk drives for the data and the associated data; and writes the data to the allocated storage space on the hard disk drive. In some implementations the computer program code instructions allocate an optimal allocation unit of storage on the hard disk drive, the optimal allocation unit comprising a plurality of sequential minimum allocation units of storage. In some implementations the computer program code instructions write the data to one of the sequential minimum allocation units of storage. In some implementations a host application writes the data and associated data to a logical production volume in a spatial sequence, and the computer program code instructions write the data and associated data to the allocated minimum allocation units of storage in the spatial sequence. In some implementations the host application writes the data and associated data to the logical production volume in a temporal sequence, and the computer program code instructions write the data and associated data to the allocated minimum allocation units of storage such that the spatial sequence differs from the temporal sequence. In some implementations the logical production volume is thinly provisioned, and the computer program code instructions allocate the sequential storage space on the hard disk drive for the data and the associated data by marking sequential locations in an allocation table as written. In some implementations the computer program code instructions add a pointer to the allocation table, the pointer indicating a location of the minimum allocation unit at which the data is written to the allocated storage space on the hard disk drive. In some implementations the computer program code instructions sequentially read the data and associated data from the hard disk drive.

DETAILED DESCRIPTION

Some aspects, features and implementations described herein may include machines such as computers, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor devices. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible features. For example, multiple virtual computing devices could operate simultaneously on one physical computing device. The term "logic" is used to refer to special purpose physical circuit elements and software instructions that are stored on a non-transitory computer-readable medium and implemented by multi-purpose tangible processors.

Figure 1:
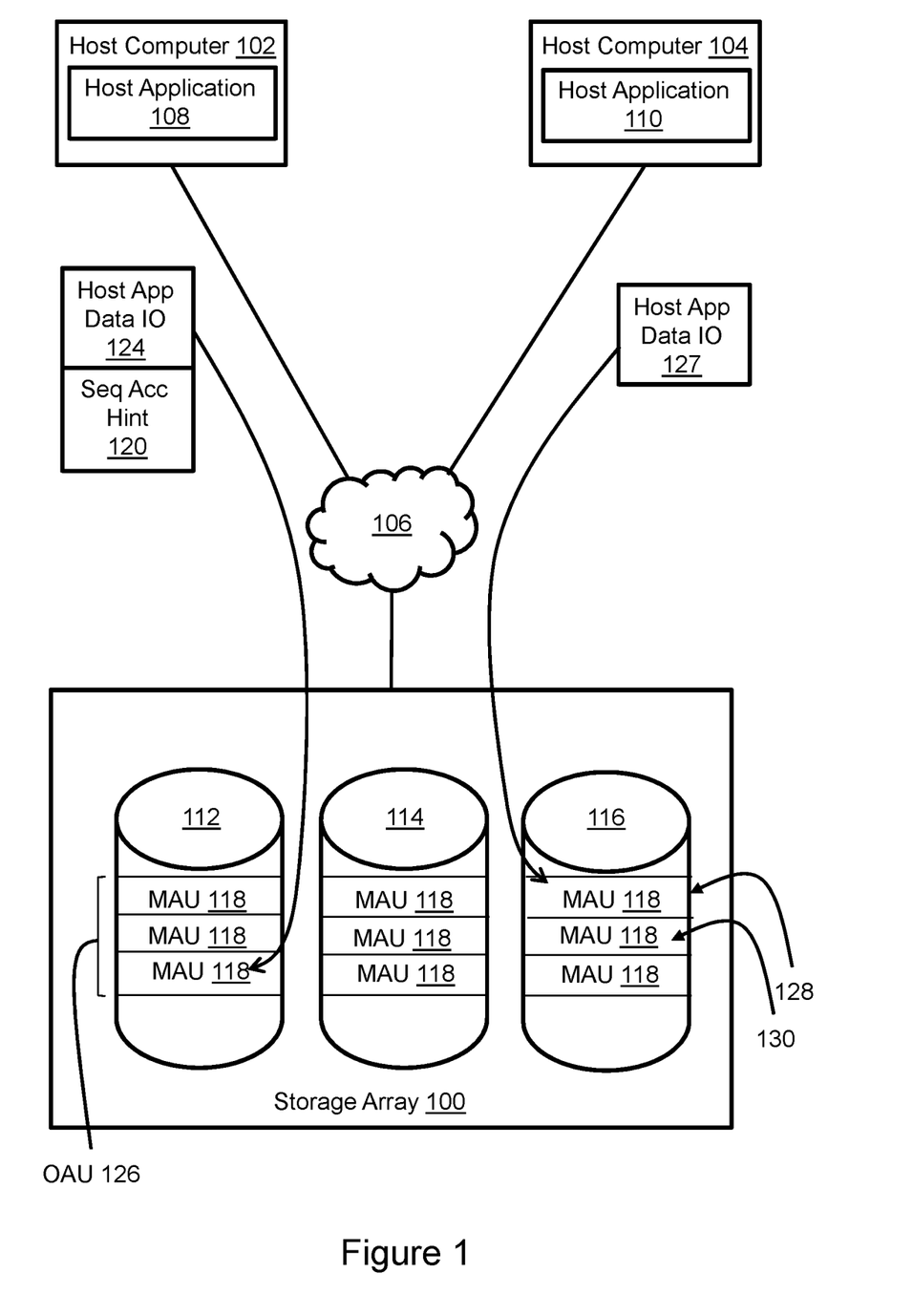
FIG. 1 illustrates a computer network in which sequential access hints are provided to a storage array by host computers in order to enable allocation of sequential MAUs (minimum allocation units) for sequential storage of host application data that will be accessed sequentially.

FIG. 1 illustrates a computer network in which sequential access hints are provided to a storage array 100 by host computers 102, 104 in order to facilitate allocation of storage and subsequent sequential access of host application data. Any number of host computers could be supported by the storage array 100, and any number of storage arrays could be included in the computer network. The host computers 102, 104 are connected to the storage array 100 via a communication network 106. The communication network 106 may include various network nodes, e.g. switches, routers, hubs, and other network devices, and may include one or more of the Internet, a WAN (wide area network), MAN (metropolitan area network) and LAN (local area network). Host applications 108, 110 run on the host computers 102, 104, respectively. Examples of host applications may include but are not limited to file servers, block servers and databases. Multiple instances of a host application may run on a host computer.

The host applications use the data storage services of the storage array 100. For example, the host applications may write host application data to the storage array and read host application data from the storage array in order to perform various host application functions. The storage array 100 may include a wide variety of features for protecting against loss of host application data and assuring availability of host application data. The storage array 100 maintains at least some of the host application data on non-transitory persistent storage that includes spinning media HDDs (hard disk drives) 112, 114, 116. The HDDs each have a total storage capacity that may be organized into various fixed size MAUs (minimum allocation units) 118 of storage capacity for management purposes. A sector may be the smallest unit of storage that a HDD is capable of processing. For example, a sector may be provided by the HDD in response to a read, or overwritten in response to a write, even if only a portion of the sector is requested to be read or written by the host application. A sector may correspond to a portion of a concentric band of the spinning disk and, for context and without limitation, 1 sector may be 512 bytes, 1 block may be 8 sectors, 1 track may be 32 sectors, and 1 cylinder may be 15 tracks. The MAU may be implemented as 1 track of contiguous or adjacent sectors, but this should not be viewed as limiting because the MAU may be implemented as any of a wide variety of fixed sizes and configurations.

One aspect of HDD design and performance is that accessing sequential storage locations, for example and without limitation the locations within a concentric band, is generally less time-consuming than accessing non-sequential storage locations. The reason for this is that in order to access a location on a spinning media HDD the disk drive controller causes the disk drive head to move to the position of the concentric band associated with the storage location being accessed so that the disk drive head can read or write the data at that location. Accessing locations associated with spatially diverse concentric bands requires the drive head to be moved between those bands, and such drive head movement incurs a delay known as seek time. In contrast, when the data that is being accessed is sequentially located on the HDD it is not necessary to perform long, time consuming movement of the drive head between individual accesses. Sequential access of sequentially located data thus requires less time than sequential access of non-sequentially located data. However, not every extent of host application data is necessarily accessed in sequence with other specific extents of host application data, and it is not generally apparent to the storage array as host application data is being written by a host computer how to recognize the particular extents of host application data that will later be sequentially accessed.

In order to enable the storage array 100 to recognize host application data that is likely to be sequentially accessed as that data is being written, the host computers 102, 104 provide sequential access hints when writing the data. For example, sequential access hint 120 may be provided with corresponding respective host application data that is being written in an IO 124. Sequential access hint 120 indicates to the storage array that the host application data being written via IO 124 is associated with other host application data that will be written to the storage array, where the association is that the data is likely to be accessed in sequence by host application 108 at some later time. In response to the hint the storage array 100 allocates a sequentially located set of MAUs. The allocated MAUs are used to store the data being written by IO 124 and, later, to store the associated data written by the host computer to the storage array. The associated data may also be sent to the storage array with hints but the storage array recognizes that the MAUs have already been allocated for the data so the allocated MAUs are used to store the associated data. Thus, data that is likely to be sequentially accessed is stored in sequential locations on the HDD while it is being written, in contrast with, e.g., being written to random locations and later relocated.

In the illustrated example the allocated sequential range of MAUs is referred to as an OAU (optimal allocation unit) 126. The term "optimal" as used in the present disclosure is not necessarily indicative of being most favorable for any particular purpose and should not be interpreted as limiting. The MAUs associated with the OAU may be located in the same concentric band or adjacent concentric bands of the HDD, although this should not be viewed as limiting. In one implementation the OAU 126 has a size corresponding to 42 MAUs, although that should not be viewed as limiting and the OAU may be any integer multiple number of MAUs. The OAU 126 may be allocated anywhere on a single HDD where sufficient contiguous free space is available. In the illustrated example the data associated with IO 124 is written to one or more MAUs 118 in the allocated OAU 126. Subsequently written host application data that is associated with the IO 124 data, and thus likely to be sequentially accessed by the host application, is also written to MAUs in the OAU 126. In general the host computer will write the associated data asynchronously to the storage array, and in random order. Performance of the HDD 112 and the storage array 100 in terms of response time may be improved when subsequently providing sequential access to the data because the data is sequentially located on the HDD. Moreover, computationally costly relocation of data, such as via defrag operations, may be mitigated.

As previously mentioned, not all extents of host application data are necessarily associated with other extents of host application data. In the illustrated example an IO 127 for writing data that is not associated with other data that is likely to be accessed in sequence is not associated with a sequential access hint. The storage array 100 is responsive to the absence of a sequential access hint to write the data associated with IO 127 to an MAU 118 at an available location 128 on one of the HDDs. The location 128 may be selected at random or purposefully selected to reduce wasted space on the HDD 116. Adjacent MAUs at sequential locations, e.g. location 130, on the HDD may be allocated for other non-associated host application data.

Figure 2:
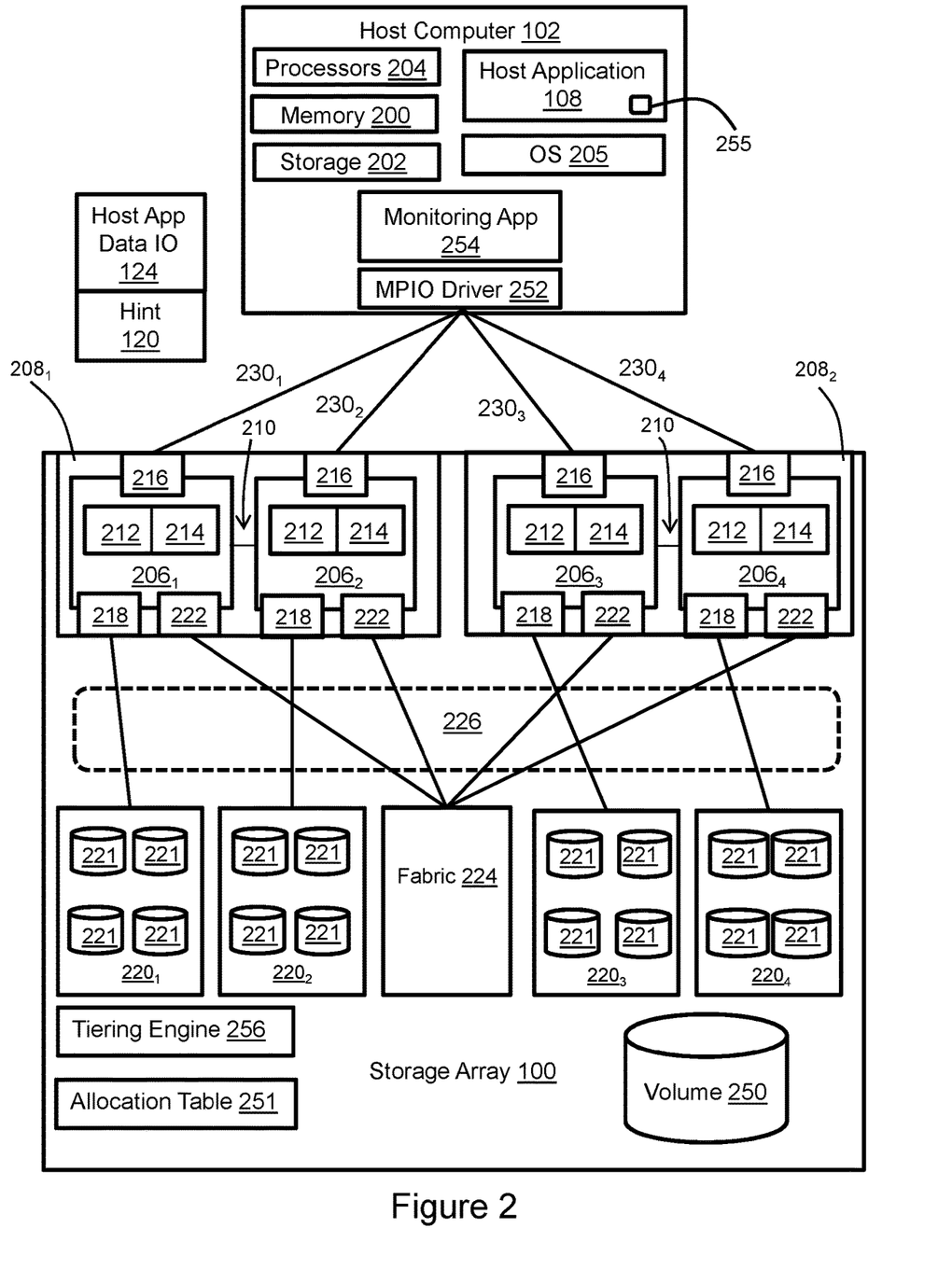
FIGS. 2 and 3 illustrate generation a sequential access hint and allocation of an OAU (optimal allocation unit) in greater detail.

A more detailed description of some aspects will now be provided with reference FIG. 2. The host computer 102 may be a server with volatile memory 200, persistent storage 202, tangible processors 204, and an operating system 205. The host computer might support virtual hosts running on virtual machines or containers, and although an external host computer is illustrated, internal hosts may be instantiated within the storage array. The storage array 100 includes a plurality of computing nodes $206_1$-$206_4$. Pairs of computing nodes ($206_1$, $206_2$) and ($206_3$, $206_4$) may be organized as storage engines $208_1$, $208_2$, respectively, for purposes of failover. The paired computing nodes of each storage engine may be directly interconnected by communication links 210. Each computing node includes at least one tangible multi-core processor 212 and a local cache 214. The local cache may include, for example and without limitation, volatile memory components such as RAM (random access memory) and non-volatile memory components such as high performance SSDs (solid state devices). Each computing node may include one or more FEs 216 (front-end directors, aka front end adapters) for communicating with the host computer 102. Each computing node $206_1$-$206_4$ may also include one or more BEs 218 (back end directors, aka back end adapters) for communicating with respective associated back end storage bays $220_1$-$220_4$, thereby enabling access to managed drives 221. The managed drives may include tangible storage devices of one or more technology types, for example and without limitation SSDs such as flash, and HDDs such as SATA (Serial Advanced Technology Attachment) and FC (Fibre Channel). For purposes of explanation the managed drives will be described herein as HDDs including the previously discussed HDDs 112, 114, 116 (FIG. 1). Each computing node may also include one or more CAs (channel directors, aka channel adapters) 222 for communicating with other computing nodes via an interconnecting fabric 224. Each computing node may allocate a portion or partition of its respective local cache 214 to a virtual shared cache 226 that can be accessed by other computing nodes, e.g. via DMA (direct memory access) or RDMA (remote direct memory access).

The computing nodes $206_1$-$206_4$ create and maintain a logical volume 250 for host application 108. Without limitation, the logical volume 250 may be referred to as a device, production volume, production LUN or host LUN, where LUN (logical unit number) is a number used to identify the logical storage volume in accordance with the SCSI (small computer system interface) protocol. The logical volume 250 represents an abstraction layer between the managed drives 221 and the host computer 102. From the perspective of the host computer 102 the logical volume 250 is a single data storage device having a set of contiguous fixed-size LBAs (logical block addresses) on which data used by the host application 108 resides. However, the data used by the host application may actually be maintained by the computing nodes at non-contiguous addresses on various different managed drives 221. The logical volume 250 may be thinly provisioned. A thinly provisioned volume is characterized by having greater apparent storage capacity than actual storage capacity. For example, a thinly provisioned device of capacity n blocks may have less than n blocks of actual storage capacity. The storage array maintains metadata indicative of the locations of extents of host application data on the managed drives. For example, in response to an IO from the host computer 102 the storage array 100 searches for a pointer in an allocation table 251. Specifically, the storage array searches for an entry in the allocation table associated with the logical volume address indicated by the IO 124. The pointer, if it exists, indicates where to find the data in the managed drives. If no pointer is found in the allocation table, e.g. because the track has not been written, then storage space is allocated in the managed drives and a pointer entry is made in the allocation table pointing to the allocated space. Maintaining metadata that maps actual locations of host application data on the managed drives locations on the production volume 250 allows data to be placed on the managed drives in accordance with various techniques for balancing performance against utilization efficiency.

An MPIO (multi-path input-output) driver 252 in the host computer 102 is responsive to IO requests from the host application 108 to provide access to the logical volume 250. There are multiple paths $230_1$-$230_4$ between the host computer 102 and the storage array 100, e.g. one FC path per FE 216. Each path may have a locally unique address that is known to the MPIO driver. However, the host OS 205 and host application 108 are not aware of the paths and addresses because they view the logical volume 250 as being available via a single logical path. The MPIO driver 252 is responsive to an IO request from the host application 108 to select one of the paths $230_1$-$230_4$ to send the IO to the storage array 100. The paths may be selected by the MPIO driver based on a wide variety of techniques and algorithms including, for context and without limitation, performance and load balancing. The storage array temporarily places data for servicing IOs associated with the logical volume 250 in the shared cache 226. The shared cache 226 may enable the logical volume 250 to be reachable via all of the computing nodes and paths, although the storage array can be configured to limit use of certain paths to certain logical volumes. For example, the logical volume 250 may be configured to be accessible via only a subset of FAs 216.

A monitoring application 254 running on the host computer 102 monitors the host application 108. In particular, the monitoring application monitors operation of active processes 255 of the host application. Certain host application processes are known to be associated with generation of host application data that is sequentially accessed. The host application may write the data to sequential locations of production volume 250 but the IOs may be generated asynchronously and in random order. Consequently, in the absence of hints the associated host application data might be randomly distributed on the managed drives. When such a host application process generates an IO request to write such data to the production volume 250 in the illustrated implementation the monitoring application 254 recognizes the event, e.g. via the association of the data with the particular process or type of process, and prompts the MPIO driver 252 to generate the sequential access hint 120 that is associated with the IO 124. For example and without limitation, the hint 120 may be included in a CDB (command descriptor block) that contains information which describes the various addresses, control bits and functional bits used for data transfer operations. The sequential access hint 120 may indicate, for example, that a specified or unspecified range of sequential locations of the production volume 250 are going to be written by the host application 108 in the future. Some types of sequential data that do not require high performance sequential access may be excluded, for example and without limitation database logs.

Figure 3:
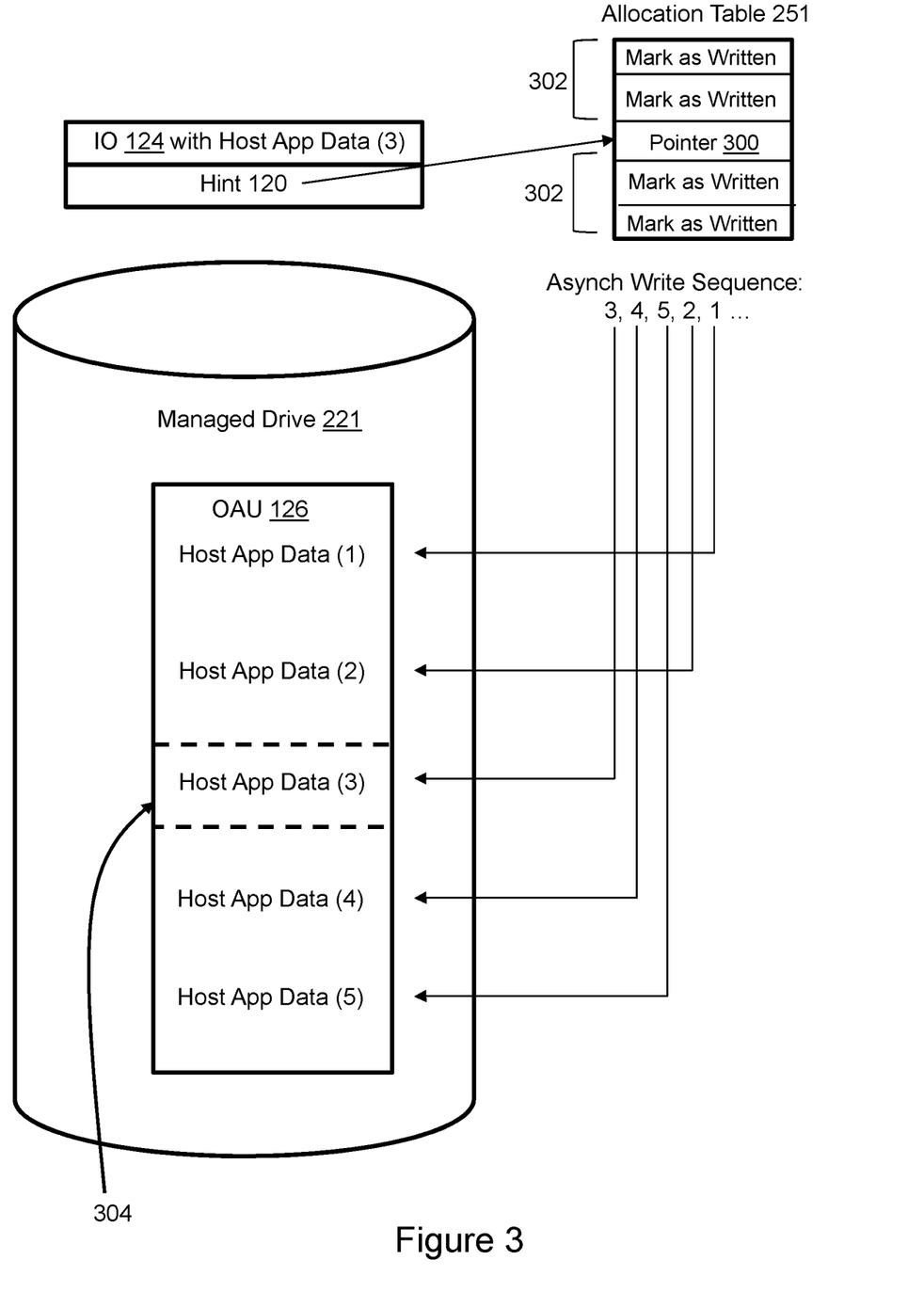

Referring to FIG. 3, in response to the IO 124 with sequential access hint 120 a pointer 300 is added to the allocation table 251 and the other sequential locations 302 being allocated, e.g. corresponding to the MAUs of the OAU 126, are marked as written. The pointer 300 points to the MAU 304 on the managed drive 221 where the data is written in the allocated OAU 126. Subsequent asynchronous writes of associated host application data to the production volume are also written into MAUs in the OAU 126 by adding pointers to the allocation table that refer to the MAUs on the managed drive where the data is written.

The associated host application data is not necessarily written to the OAU in a spatial sequence corresponding to the temporal sequence in which it is received. In the illustrated example data (3) is written in an initial IO 124 and the associated data is asynchronously written by the host application to the storage array in the temporal order data (4), data (5), data (2), data (1) in separate IOs. The receipt of data (3) with hint 120 prompts allocation of the OAU 126. Further, data (3) is written into an MAU 304 having a spatial location in the OAU 126 that corresponds to the spatial location of application data (3) in the allocation table 251, and thus corresponds to the spatial location to which the host application wrote the data in the production volume. The same is done for subsequent writes of associated data. Consequently, the spatial order in which the data is organized in sequence in the OAU 126 is data (1), data (2), data (3), data (4), data (5), even though the temporal sequence in which that data is written is data (3), data (4), data (5), data (2), data (1). In other words, the spatial sequence in the OAU is made to match the spatial sequence in the allocation table and the production volume.

As a non-limiting example for contextual purposes, the host application data being written to spatially sequential locations could be associated with records of service use being created by a service provider such as a utility. The service provider may bill subscribers monthly for the services. In order to generate such bills in a timely manner the host application, which may be a billing program database, stores records of service use during the month, and then on some date or dates runs database queries and generates reports in order to generate separate records of all uses of the service by particular subscribers for the month. Storing related data, e.g. service use records for each subscriber, sequentially in one or more OAUs on HDDs corresponding to the sequential order of the thinly provisioned production volume facilitates subsequent retrieval of that data for timely generation of monthly bills by the database.

Referring again to FIG. 2, a storage tiering engine 256 may be implemented by the storage array 100. The storage tiering engine generates hints to promote relatively active data (recently accessed) to higher performance storage media, e.g. to tier 0 SSD managed drives, and demote relatively inactive data (not recently accessed) to lower performance storage media, e.g. to tier 1 HDD managed drives. The tiering program monitors data access activity including frequency of access to individual extents and logical production volumes in order to generate the storage tiering hints. Storage tiering hints may also be generated outside of the storage array. Those of ordinary skill in the art will recognize that storage tiering hints are not equivalent to sequential access hints.

Figure 4:
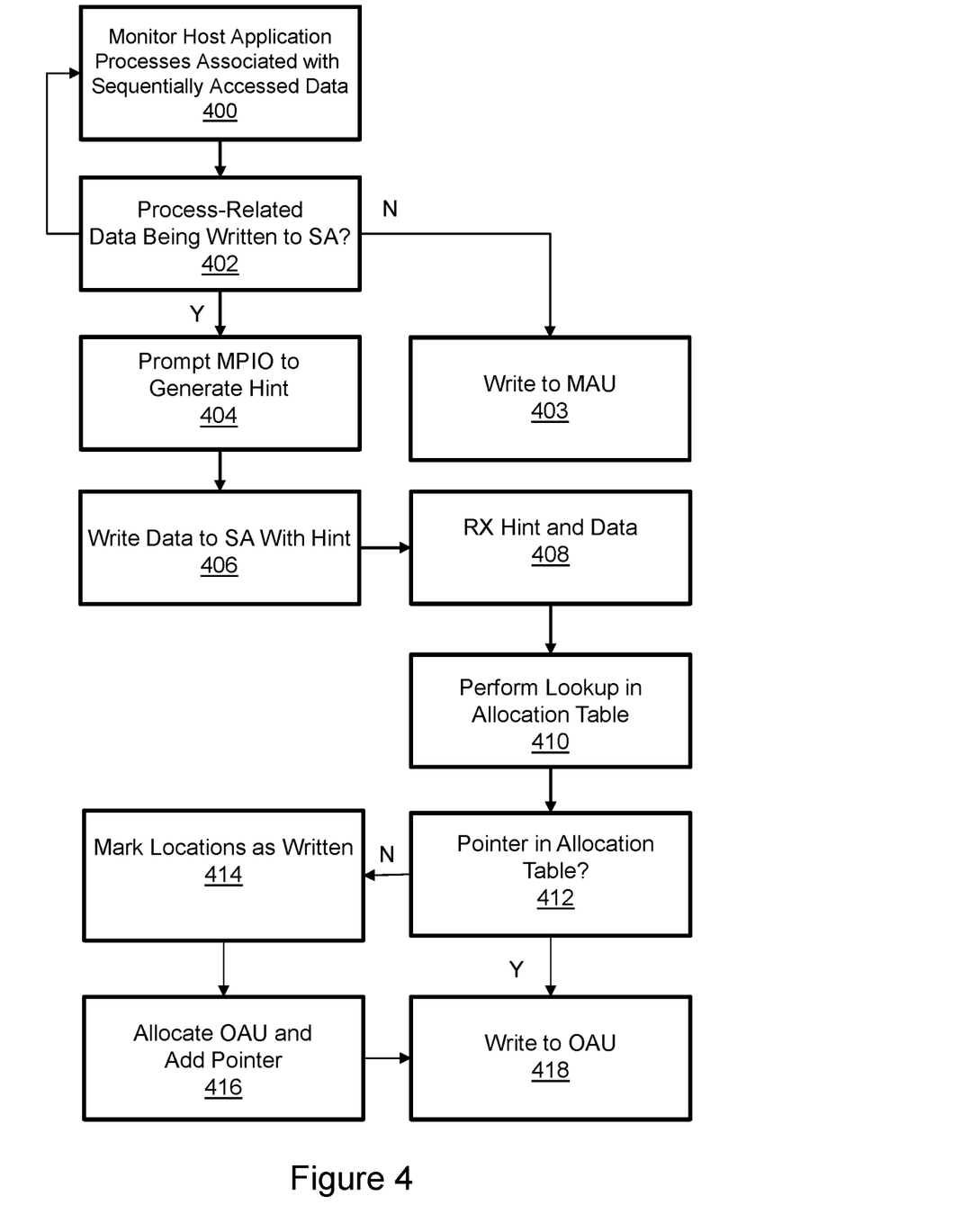
FIG. 4 illustrates a technique for generating and using sequential access hints.

FIG. 4 illustrates a technique for generating and using sequential access hints. As indicated in block 400 the host application is monitored for activity associated with processes that generate sequentially accessed data. If data related to such a process is being created and written to the production volume presented by the storage array as determined in block 402 then the monitoring application prompts the MPIO driver to generate a sequential access hint as indicated in block 404. The MPIO driver subsequently sends an IO with the sequential access hint to the storage array in order to write some of the associated data to the storage array as indicated in block 406. If the data being written to the storage array is not associated with a process that generates sequentially accessed data then the data is written to an MAU as indicated in block 403. As indicated in block 408 the storage array receives the IO with the hint and data. The storage array then performs a lookup in the allocation table to determine whether there is a pointer corresponding to the address indicated in the IO as indicated in block 410, i.e. the production volume address. If there is no corresponding pointer in the allocation table as determined in block 412 then the MAU has not been previously allocated and written so the allocation table is updated by marking a range of MAUs corresponding to an OAU as written as indicated in block 414. As indicated in block 416 the OAU is allocated a set of contiguous MAUs on an HDD and a pointer is added to the allocation table to indicate the location of the MAU where the data associated with the IO is being written. The data is then written to the OAU as indicated in block 418. In particular, the data is written to an MAU in the OAU at a location corresponding to the location in the allocation table at which the pointer was added, which corresponds to the location in the production volume that has been written by the IO. If the pointer is found in the allocation table in block 412 then the data is written to the OAU in an MAU corresponding to the allocation table and production volume sequential location as indicated in block 418.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. A method comprising:
in a computer network comprising a host computer and a storage array:
monitoring a predetermined subset of host application processes running on the host computer to detect generation of data that is likely to be non-sequentially written to a logical volume relative to associated data and later sequentially accessed by a host application with the associated data based on the predetermined subset of host application processes being known to be associated with temporally non-sequential generation of data that is sequentially accessed;
generating a hint indicating that the data associated with the predetermined subset of host application processes is likely to be sequentially accessed by the host application with the associated data;
sending the data and the hint to the storage array;
responsive to the hint, allocating sequential storage space on a hard disk drive in the storage array for the data and the associated data; and
writing the data to the allocated sequential storage space on the hard disk drive in the storage array.

2. The method of claim 1 wherein writing the data to the allocated storage space in the storage array comprises writing the data to a minimum allocation unit of storage on the hard disk drive.

3. The method of claim 2 wherein allocating storage space in the storage array for the data and the associated data comprises allocating an optimal allocation unit of storage on the hard disk drive, the optimal allocation unit comprising sequential minimum allocation units of storage.

4. The method of claim 3 comprising the host application writing the data and associated data to a logical production volume in a spatial sequence, and comprising the storage array writing the data and associated data to the allocated storage space in the storage array in the spatial sequence.

5. The method of claim 4 comprising the host application writing the data and associated data to the logical production volume in a temporal sequence that differs from the spatial sequence.

6. The method of claim 5 wherein generating the hint comprises a multi-path input-output driver of the host computer including the hint in a command descriptor block.

7. The method of claim 5 wherein the logical production volume is thinly provisioned, and wherein allocating sequential storage space on the hard disk drive in the storage array for the data and the associated data comprises marking sequential locations in an allocation table as written.

8. The method of claim 7 comprising adding a pointer to the allocation table, the pointer indicating a location at which the data is written to the allocated storage space on the hard disk drive in the storage array.

9. An apparatus comprising:
a processor;
computer-readable non-transitory memory;
a host application; and
computer program code stored on the computer-readable non-transitory memory, the computer program code comprising instructions that:
monitor a predetermined subset of host application processes to detect generation of host application data that is likely to be non-sequentially written to a logical volume relative to associated data and later sequentially accessed by the host application with the associated data based on the predetermined subset of host application processes being known to be associated with temporally non-sequential generation of host application data that is sequentially accessed;
generate a hint indicating that the host application data associated with the predetermined subset of host application processes is likely to be sequentially accessed by the host application with the associated data; and
send the data and the hint to a storage array.

10. The apparatus of claim 9 wherein the computer program code comprises instructions that write the data and associated data to a logical production volume in a spatial sequence corresponding to a sequence in which the data and associated data will be accessed.

11. The apparatus of claim 10 wherein the computer program code comprises instructions that write the data and the associated data to the logical production volume in a temporal sequence that differs from the spatial sequence.

12. The apparatus of claim 11 wherein the computer program code comprises instructions that select a path to the storage array and include the hint in a command descriptor block.

13. An apparatus comprising:
a storage array comprising:
a plurality of computing nodes, each computing node comprising a processor and
a cache;
a plurality of hard disk drives that are managed by the computing nodes; and
computer program code instructions on non-transitory memory that:
presents a production volume to a host application, the production volume being backed by the hard disk drives;
responsive to a hint indicating that data that is being non-sequentially written to the storage array relative to associated data is likely to be sequentially accessed by a host application with the associated data based on a predetermined subset of host application processes that generate the data being known to be associated with temporally non-sequential generation of data that is sequentially accessed, allocates sequential storage space on one of the hard disk drives for the data and the associated data; and
writes the data to the allocated sequential storage space on the hard disk drive.

14. The apparatus of claim 13 wherein the computer program code instructions allocate an optimal allocation unit of storage on the hard disk drive, the optimal allocation unit comprising a plurality of sequential minimum allocation units of storage.

15. The apparatus of claim 14 wherein the computer program code instructions write the data to one of the sequential minimum allocation units of storage.

16. The apparatus of claim 15 wherein a host application writes the data and associated data to a logical production volume in a spatial sequence, and wherein the computer program code instructions writing the data and associated data to the allocated minimum allocation units of storage in the spatial sequence.

17. The apparatus of claim 16 wherein the host application writes the data and associated data to the logical production volume in a temporal sequence, and wherein the computer program code instructions write the data and associated data to the allocated minimum allocation units of storage such that the spatial sequence differs from the temporal sequence.

18. The apparatus of claim 17 wherein the logical production volume is thinly provisioned, and wherein the computer program code instructions allocate the sequential storage space on the hard disk drive for the data and the associated data by marking sequential locations in an allocation table as written.

19. The apparatus of claim 18 wherein the computer program code instructions add a pointer to the allocation table, the pointer indicating a location of the minimum allocation unit at which the data is written to the allocated storage space on the hard disk drive.

20. The apparatus of claim 13 wherein the computer program code instructions sequentially read the data and associated data from the hard disk drive.

\* \* \* \* \*